(12) United States Patent
Dobyns et al.

(10) Patent No.: US 11,581,918 B2
(45) Date of Patent: Feb. 14, 2023

(54) NEAR FIELD COMMUNICATIONS SYSTEM HAVING ENHANCED SECURITY

(75) Inventors: Douglas Howard Dobyns, Lindon, UT (US); Howard Bernard Dobyns, Orem, UT (US); Jed Erich Woodard, Spanish Fork, UT (US); Anthony Joseph Sutera, Midway, UT (US)

(73) Assignee: Freelinc Technologies Inc., Orem, UT (US)

( * ) Notice: Subject to any disclaimer, the term of this patent is extended or adjusted under 35 U.S.C. 154(b) by 0 days.

(21) Appl. No.: 12/189,055

(22) Filed: Aug. 8, 2008

(65) Prior Publication Data

US 2009/0041241 A1 Feb. 12, 2009

Related U.S. Application Data

(60) Provisional application No. 60/954,784, filed on Aug. 8, 2007.

(51) Int. Cl.
| | |
|---|---|
| *G06F 21/82* | (2013.01) |
| *G06K 7/10* | (2006.01) |
| *H04B 5/00* | (2006.01) |
| *H04K 1/02* | (2006.01) |
| *H04K 3/00* | (2006.01) |
| *H04K 1/10* | (2006.01) |

(52) U.S. Cl.
CPC .......... *H04B 5/0031* (2013.01); *G06F 21/82* (2013.01); *G06K 7/10287* (2013.01); *H04K 1/02* (2013.01); *H04K 1/10* (2013.01); *H04K 3/42* (2013.01); *H04K 3/43* (2013.01); *H04K 3/44* (2013.01); *H04K 3/82* (2013.01); *H04K 3/825* (2013.01); *H04K 3/41* (2013.01); *H04K 3/45* (2013.01); *H04K 3/68* (2013.01)

(58) Field of Classification Search
CPC .. H04K 1/02; H04K 1/10; H04K 3/80; H04K 3/82; H04K 3/827; H04K 3/86; G06K 7/10257; G06K 7/10287; H04W 12/02; G06F 21/70; G06F 21/82; G06F 21/85
USPC .......................... 380/252; 455/41.1; 379/55.1
See application file for complete search history.

(56) References Cited

U.S. PATENT DOCUMENTS

| | | | | |
|---|---|---|---|---|
| 2,476,337 | A | * | 7/1949 | Varian ........................... 380/254 |
| 4,217,588 | A | | 8/1980 | Freeny, Jr. |
| 4,747,158 | A | | 5/1988 | Goldberg et al. |
| 5,165,098 | A | | 11/1992 | Hoivik |
| 5,243,648 | A | | 9/1993 | Gilardi et al. |
| 5,297,201 | A | * | 3/1994 | Dunlavy ........................ 380/252 |
| 5,341,423 | A | * | 8/1994 | Nossen ......................... 380/252 |
| 5,771,438 | A | | 6/1998 | Palermo et al. |
| 5,912,925 | A | | 6/1999 | Palermo et al. |

(Continued)

FOREIGN PATENT DOCUMENTS

| | | |
|---|---|---|
| WO | WO 02/07479 | 1/2002 |
| WO | WO 2007048399 A1 * | 5/2007 |

*Primary Examiner* — Zachary A. Davis
(74) *Attorney, Agent, or Firm* — Thorpe North & Western LLP (57) ABSTRACT

A near field communication system can include a near field generator configured to generate a near field detectable information signal. The near field generator and supporting circuitry also produces incidental electromagnetic radiation. A masking signal transmitter is used with the near field generator and radiates a masking electromagnetic signal. The masking electromagnetic signal may substantially mask the incidental electromagnetic radiation.

55 Claims, 3 Drawing Sheets

(56) References Cited

U.S. PATENT DOCUMENTS

| | | |
|---|---|---|
| 5,982,764 A | 11/1999 | Palermo et al. |
| 6,134,420 A | 10/2000 | Flowerdew et al. |
| 6,459,882 B1 | 10/2002 | Palermo et al. |
| 6,721,423 B1 | 4/2004 | Anderson et al. |
| 6,819,762 B2 | 11/2004 | Jones |
| 7,024,175 B1 | 4/2006 | Moquin et al. |
| 7,035,608 B2 | 4/2006 | Palermo et al. |
| 7,088,248 B2 | 8/2006 | Forster |
| 7,142,811 B2 | 11/2006 | Terranova et al. |
| 7,149,552 B2 | 12/2006 | Lair |
| 7,202,784 B1 | 4/2007 | Herwig |
| 7,215,924 B2 | 5/2007 | Palermo et al. |
| 7,236,741 B2 | 6/2007 | Palermo et al. |
| 7,254,366 B2 | 8/2007 | Palermo et al. |
| RE39,982 E | 1/2008 | Palermo et al. |
| RE40,018 E | 1/2008 | Palermo et al. |
| 7,532,901 B1 | 5/2009 | LaFranchise et al. |
| 7,565,187 B1 | 7/2009 | Dynok et al. |
| 7,574,173 B2 | 8/2009 | Terranova et al. |
| 7,808,389 B2 * | 10/2010 | Finkenzeller ............... 340/572.4 |
| 8,035,521 B2 * | 10/2011 | Lees ........................ 340/572.4 |
| 8,830,033 B1 | 9/2014 | Duxbury et al. |
| 2001/0032405 A1 | 10/2001 | Kaminski |
| 2003/0161410 A1 | 8/2003 | Smith et al. |
| 2004/0100359 A1 | 5/2004 | Reade et al. |
| 2005/0058292 A1 * | 3/2005 | Diorio et al. ................. 380/270 |
| 2005/0064915 A1 | 3/2005 | Lair |
| 2006/0109983 A1 | 5/2006 | Young et al. |
| 2006/0226969 A1 | 10/2006 | Bandy |
| 2006/0244630 A1 | 11/2006 | Finkenzeller |
| 2007/0004464 A1 | 1/2007 | Lair et al. |
| 2007/0008140 A1 | 1/2007 | Saarisalo et al. |
| 2007/0046439 A1 | 3/2007 | Takaku et al. |
| 2007/0194931 A1 | 8/2007 | Miller et al. |
| 2008/0150732 A1 | 6/2008 | Bunza |
| 2008/0246486 A1 | 10/2008 | Forgang et al. |
| 2009/0029743 A9 | 1/2009 | Lair et al. |
| 2009/0081943 A1 | 3/2009 | Dobyns et al. |
| 2012/0203620 A1 | 8/2012 | Dobyns et al. |

* cited by examiner

NEAR FIELD COMMUNICATIONS SYSTEM HAVING ENHANCED SECURITY

PRIORITY

This application claims priority to U.S. Provisional Patent Application Ser. No. 60/954,784 filed on Aug. 8, 2007 which is incorporated herein by reference in its entirety.

BACKGROUND

Near field communication systems can prove useful in a variety of analog or digital information exchange applications such as audio transmission, data transmission, video transfer, and message signaling. For example, a near field communication system can be used to provide a wireless link between a headset and a radio, such as, a public service transceiver, military transceiver, cellular telephone, amateur radio transceiver, or the like. The radio may, for example, be worn on a belt while the headset allows for hand-free operation.

One advantage of such comparatively short range communication systems is increased security due to the reduced radiation emission levels. This security benefit makes short range communication systems valuable for wireless links where secure information is exchanged. However, while near field communication is inherently short range, eavesdropping may be possible. Accordingly, techniques to enhance the security of near field communications systems are desired.

SUMMARY OF THE INVENTION

A system and method are provided for a near field communication system. The system can include a near field generator configured to generate a near field detectable information signal. The near field generator and supporting circuitry also produce incidental electromagnetic radiation. A masking signal transmitter is used with the near field generator and radiates a masking electromagnetic signal. The masking electromagnetic signal has characteristics that may be substantially similar to the incidental electromagnetic radiation and substantially uncorrelated to the information.

BRIEF DESCRIPTION OF THE FIGURES

Additional features and advantages of certain exemplary embodiments of the invention will be apparent from the description which follows, taken in conjunction with the accompanying drawings, which together illustrate, by way of example, features of the invention; and, wherein.

DETAILED DESCRIPTION OF EXEMPLARY EMBODIMENTS

Reference will now be made to exemplary embodiments of the invention, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

By the term "substantially" is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention relate to near field communications. More particularly, exemplary embodiments of the present invention relate to enhanced security in a near field communications system.

Figure 1:
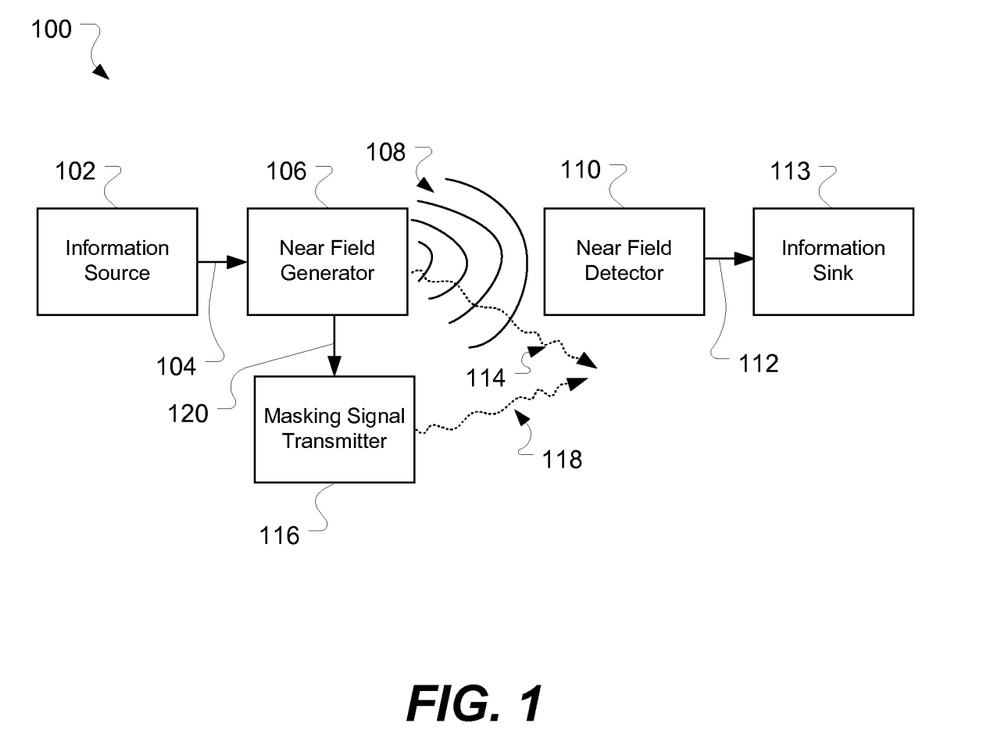
FIG. 1 is a block diagram illustration of a near field communications system having enhanced security in accordance with an exemplary embodiment of the present invention.

FIG. 1 illustrates a near field communication system in accordance with a first exemplary embodiment of the present system. The near field communication system, shown generally at 100, includes an information source 102 that produces information 104. The information may be in an analog or digital format. For example, the information may be a continuous analog audio signal, a digitized audio signal, a video signal, a data sequence, a simple on/off signal, or the like. As a particular example, the information source may include a microphone for converting an acoustic signal into an electric signal, a digitizer, other electronic equipment, or combinations thereof.

The system includes a means for generating a near field detectable information signal, such as a near field generator 106. The near field generator generates a near field signal 108 having the information encoded therein. For example, the near field generator may generate a magnetic or electric field. The near field generator may include a coil (for magnetic induction) or capacitance plate (for electrostatic induction) for generating the near field.

A near field detector 110 can sense or measure the near field signal 108. For example, the near field detector can magnetically or electrostatically couple to the near field and decode the information encoded in the near field. The decoded information 112 may be output to an information sink 113. For example, the information sink may include: a speaker that converts an electronic signal into an acoustic signal, digital to analog conversion, other electronics equipment, or combinations thereof.

Near field communication using magnetic or electrostatic coupling can also be used in data communication applications. For example, near field magnetic communication can be used to connect a personal computer or laptop to one or more peripheral devices such as a mouse, keyboard, speakers, audio headsets, microphones, or other data oriented peripherals in a system. Wireless programming of devices can also take place using near field communication, and configuration data can be sent to a device to change the device's setup. Signaling or switching applications can use near field communications to turn a device on/off or set a device to a simple state (e.g., ready to receive).

An advantage of using near field communications is that the strength of the near field 108 typically decays rapidly with increased distance from the near field generator 106. This helps to reduce interference between near field communication systems by using small amounts of spatial separation. Another advantage of the rapid decay of field strength is a certain amount of security, since it can be difficult to detect the near field a large distance away. More particularly, electric and magnetic field power densities typically drop by about 60 decibels (dB) per decade of distance.

Unfortunately, the near field generator 106 may produce incidental electromagnetic radiation 114. For example, unwanted and spurious electromagnetic emissions can be generated by the near field generator and associated circuitry. At least some of this electromagnetic information may be correlated to the information 104, and thus may be detectable and decodable by outside systems.

For example, the incidental electromagnetic radiation 114 may be induced by time variation in the generated near field. A time varying magnetic field generates an electric field, and vice versa, as described by Maxwell's equations, and can radiate in the form of a propagating electromagnetic wave. Propagating electromagnetic waves drop off in amplitude much more slowly with distance than the electric or magnetic field strength used for near field communication. For example, propagating electromagnetic waves tend to drop off by about 20 dB per decade of distance, as compared to drop off by about 60 dB per decade of distance for magnetic or electrostatic coupling. Accordingly, the incidental electromagnetic radiation can adversely affect the security of the near field communication system 100, if an eavesdropper detects the incidental electromagnetic radiation and extracts information from it.

Filtering and shielding can be included to help reduce the level of incidental electromagnetic radiation. Furthermore, the near field generator may be designed to provide high efficiency near field generation while providing low efficiency electromagnetic radiation. For example, a loop antenna may be used to generate a magnetic field. The efficiency of the propagated electromagnetic radiation is reduced as the transmitting loop's antenna diameter is decreased as compared to the transmitted frequency modulated through the loop antenna. Unfortunately, incidental electromagnetic radiation can be difficult to avoid, and undesirable levels of radiation may be present.

The near field system 100 can therefore include a means for radiating a masking signal, such as a masking signal transmitter 116 to radiate a masking electromagnetic signal 118. The masking electromagnetic signal may substantially reduce a detectability of at least one of the incidental electromagnetic radiation and the information. Further, the masking electromagnetic signal may substantially reduce the detectability, decodability or extractability of the information from the incidental electromagnetic radiation. In one exemplary implementation, the masking electromagnetic signal may be generated with characteristics substantially similar to the incidental electromagnetic radiation, so that the masking electromagnetic signal is difficult to distinguish or separate from the incidental electromagnetic radiation. For example, the masking electromagnetic signal may be an artificial noise floor or jamming signal, such as random noise, random pulses, stepped tones, warbler, randomly keyed carrier wave, pulses, recorded sounds, and the like. Preferably, the masking electromagnetic signal is uncorrelated with the information. Accordingly, the masking electromagnetic signal helps to enhance the security of the near field communication system by making it difficult for an eavesdropper to detect the information, decode or extract the information, and/or detect the incidental electromagnetic radiation.

For example, the masking electromagnetic signal may be configured to occupy substantially the same bandwidth as the incidental electromagnetic radiation. In one exemplary embodiment, a near field communication system may have a carrier frequency of 13.56 MHz and modulate the near field transmission at 250 kHz above and 250 kHz below the 13.56 MHz carrier frequency. Accordingly, the masking electromagnetic signal may be configured to occupy a bandwidth from 13.3 MHz to 13.82 MHz. Small differences in bandwidth between the masking electromagnetic signal and the incidental electromagnetic radiation may occur without adversely impacting the security, and thus the bandwidths need not be precisely the same.

In another exemplary embodiment, the masking signal may occupy a wide bandwidth. For example, the near field communication system may have a carrier frequency of 100 MHz with a bandwidth of 1 MHz, where the modulated near field is between 99.5 MHz and 100.5 MHz. Accordingly, the masking signal may provide masking between 50 MHz and 500 MHz frequencies, thus masking the incidental electromagnetic radiation without revealing the precise modulation frequency of the near field system. This may make detection of the electromagnetic radiation more difficult because a larger bandwidth needs to be searched in order to analyze and decode the incidental electromagnetic radiation.

Alternatively, a wideband signal can be used to mask a spectrum containing multiple carrier frequencies that may be used by a carrier frequency applying frequency hopping. For example, the near field system may use multiple carrier frequencies to allow multiple devices to function within a short range of each other or to function despite interfering signals generated by environmental sources. In this type of short range system, the possible carrier frequencies may be 1 MHz, 5 MHz, 10 MHz, 15 MHz, and 20 MHz. Thus, the wideband masking electromagnetic signal may be from 500 KHz to 21 MHz to mask incidental electromagnetic radiation at all possible frequencies.

Harmonic incidental radiation can also be a concern when trying to maintain an electromagnetic profile that is difficult for potential eavesdroppers to detect. In one exemplary embodiment, a wideband masking signal may be used to mask harmonically generated frequencies as needed. In addition, the harmonics of the masking signal may be used to mask the harmonics of the carrier frequency. In another exemplary embodiment, multiple narrow-band masking signals at defined frequencies can be used to mask detectable harmonic frequencies. For example, certain primary or secondary harmonics may be more detectable to an eavesdropper, and therefore these harmonics may be masked by using multiple narrow-band masking signals generated to hide harmonics of concern.

In one exemplary embodiment, the masking electromagnetic signal can be radiated with a field strength similar to the incidental electromagnetic radiation. If the masking electromagnetic signal is too weak, relative to the incidental electromagnetic radiation, it may not adequately mask the incidental electromagnetic radiation. In contrast, while radiating a high power masking electromagnetic signal can provide better masking, this may result in undesirable effects such as (1) electromagnetic interference to other equipment (2) increased power consumption, and (3) reduced covertness for the near field communication system.

In particular, one advantage of the near field communication system 100 is the relatively low probability of detection of the near field generator at a distance. Low probability of detection is helpful when covertness is desired, such as in a warfare situation. As noted above, the near field falls off at about 60 dB per decade of distance. Detection of the near field communication system at a distance using near field coupling is difficult, requiring an adversary to be very close or to use a large detector array or antenna. At sufficient distances, detection of the near field can become a practical impossibility due to noise caused by other stray fields and noise sources with the adversary's equipment. Accordingly, an adversary may attempt to detect incidental electromagnetic radiation from the near field communication system from a distance beyond which the near field is detectable.

While the incidental electromagnetic radiation 114 is generally at a much lower level (relative to the near field strength) in areas proximate to the near field generator 106, the incidental electromagnetic radiation can propagate with about 20 dB per decade of distance loss. At a distance that is dependant upon the characteristics of the near field generator, the incidental electromagnetic radiation may have a field strength that is higher than the field strength of the near field. Accordingly, an adversary may attempt to detect the incidental electromagnetic radiation. To address the detectability of the incidental electromagnetic radiation a masking electromagnetic signal my be implemented. However, energy radiated in the masking electromagnetic signal, while helpful to block eavesdropping, can increase the detectability of the near field generator.

To maximize masking, a larger signal level for the masking electromagnetic signal is desired, but to minimize detectability, a smaller signal level for the masking electromagnetic signal is desired. Accordingly, providing the electromagnetic signal with substantially the same field strength as the incidental electromagnetic radiation may provide a good compromise between these opposing effects. For example, the masking electromagnetic signal field strength may equal the incidental electromagnetic radiation field strength within a few decibels. The masking electromagnetic signal and the incidental electromagnetic radiation signal levels may vary with time due to tolerances, initial calibration, temperature, etc. during normal equipment operation.

Directional differences between the radiation of the masking electromagnetic signal and the incidental electromagnetic signal can result in variations in the relative field strengths at certain positions relative to the near field generator 106. Areas in which the relative field strength of the electromagnetic signal is higher may make it easier for an eavesdropper to detect the information at those positions. Of course, depending on the application, such a situation may be acceptable. For example, in ground-based communications, the directions of most concern are in the horizontal direction, and radiation in an upward direction (which requires aerial platforms for detection or interception) may be of less concern.

It may be desirable for the masking electromagnetic signal to be radiated with similar directivity as the incidental electromagnetic radiation to avoid areas in which the masking electromagnetic signal is varied in signal strength from the incidental electromagnetic radiation. For example, if the incidental electromagnetic signal is radiated generally in one direction relative to the near field generator, the masking electromagnetic signal can be radiated generally in the same direction. Of course, the radiating mechanism for the incidental electromagnetic radiation may be different than the masking electromagnetic signal. As a particular example, in a magnetic induction system, the near field can be generated using a coil. The coil is a relatively low efficiency radiator for the electromagnetic radiation, and produces electromagnetic radiation propagating mostly in directions aligned with the plane of the loop. In contrast, the masking electromagnetic signal may be radiated using a small dipole or bowtie antenna. Accordingly, it may be helpful to align the antenna used to radiate the masking electromagnetic signal appropriately to match the electromagnetic radiation from whatever structures are used to generate the near field.

In light of the above considerations, maintaining similar signal strengths between the incidental electromagnetic radiation 114 from near field generator 106 and the masking electromagnetic signal 118 from masking signal transmitter 116 can be enhanced by positioning the antenna or other radiating structure of the masking signal transmitter near the near field generator. For example, the antenna can be integrated into the housing of the near field generator or the antenna can be located on or adjacent to the near field generator.

The signal level of the masking electromagnetic signal may be selected so that, in combination with the incidental electromagnetic radiation, the total propagated energy is less than a defined level at a preset distance from the near field generator. For example, a typical noise floor level for eavesdroppers or adversaries may be determined, and the system can be designed to achieve low probability of detection at a preset distance from the adversary.

As noted above, it is beneficial for the signal characteristics of the masking electromagnetic signal to substantially match one or more of the characteristics of the incidental electromagnetic radiation. In addition to matching signal bandwidth, carrier frequency (if any), and signal strength, other characteristics can also be matched. For example, if the near field is modulated to encode information, a similar modulation may appear in the incidental electromagnetic radiation. Accordingly, the masking electromagnetic signal can use the same modulation scheme as is applied to the near field. It should be appreciated that the masking electromagnetic signal can be modulated with masking information that is uncorrelated to the (useful) information.

There may be instances where the characteristics of the masking electromagnetic signal are not similar to all of the characteristics of the incidental electromagnetic radiation. For example, the masking signal may reduce the achievable link distance of the near field system somewhat, when compared to near field systems without the presence of the masking signal. There may also be situations where the additional link distance is a higher priority than the security benefits of the masking signal. In these situations, the masking signal may use a lower power level or be shut off completely to provide a greater link distance regardless of the characteristics or detectability of the incidental electromagnetic signal. Therefore, it may be possible to turn on the masking signal, turn off the masking signal, and increase or decrease the power level of the masking signal independently from the incidental electromagnetic signal.

Furthermore, there may be instances where the characteristics of the masking electromagnetic signal are not similar to any of the characteristics of the incidental electromagnetic radiation and yet the collective characteristics of the masking electromagnetic signal are sufficient to mask the incidental electromagnetic radiation and thereby reduce the detectability of the incidental electromagnetic radiation. Still further, the masking electromagnetic signal may be generated to allow detection of the incidental electromagnetic radiation and yet substantially reduce the detectability, decodability and/or extractability of information from the incidental electromagnetic radiation.

In addition, there may be instances where the timing of the masking signal is independent of the incidental electromagnetic signal. For example, a CDMA (Code Division Multiple Access) or TDD (Time Division Duplex) system which enables multiple systems to co-exist through time division or time slice management may be identified by an eavesdropper through observing the timing of the presence or absence of the incidental electromagnetic signal. If the masking electromagnetic signal has timing that is similar to the incidental electromagnetic signal timing, it may be possible for the eavesdropper to determine the type of modulation scheme used by the near field system. By generating the masking electromagnetic signal using a timing scheme that is independent from the near field system or incidental electromagnetic signal's timing, the modulation of the near field system can be made more difficult to identify.

When the masking electromagnetic signal is cycled on and off corresponding to transmission by the near field system, the masking electromagnetic signal may be cycled on by at least a first defined period of time before a transmission by the near field system and may be cycled off a second defined period of time after the near field system ceases transmission. By making the duration of a transmission of the masking electromagnetic signal longer than the duration of a transmission by the near field system, the resulting incidental electromagnetic can be better masked. Further, as described above, the first and second defined periods of time may vary based on each cycle, a period of time, or the like. In addition, the masking electromagnetic signal may be constantly transmitted.

By applying masking information to the electromagnetic masking signal that is uncorrelated to the useful information, the security of the useful information is enhanced. This is because it is difficult for an eavesdropper to differentiate between the electromagnetic masking signal and the incidental electromagnetic information. For example, simply delaying the useful information to obtain the masking information produces a correlated masking signal. Direct detection of the information is difficult, due to interference between the masking signal and the incidental signal; however, techniques such as rake receivers may be used by an eavesdropper to detect the useful information. Such vulnerabilities may be avoided by appropriate selection of the masking information.

For example, the masking information may be randomized. In general, cryptographic techniques may be applied in obtaining the masking information. For example, the masking information may be selected to provide statistically similar properties as the useful information, while remaining substantially uncorrelated. For example, for digital data, the useful information may be passed through a cryptographic algorithm to obtain the masking information. The masking information may also be directly generated using a random data generator.

When useful information is encoded into the near field using a digital modulation technique (e.g., phase shift keying, amplitude shift keying, frequency shift keying, or combinations thereof) the near field varies according to modulation symbol timing. It may be helpful to couple the masking signal transmitter 116 to the near field generator 106 to enable synchronizing the modulation of the masking electromagnetic signal 118 to the symbol timing of the near field generator 106. This coupling can be done in various ways to provide symbol timing information 120 to the masking signal transmitter. For example, the near field generator can provide a timing signal to the masking signal transmitter. As another example, the masking signal transmitter may extract a timing signal from the modulated near field.

One exemplary embodiment may include a masking signal that is decoupled from the near field generator. For example, an independent random noise generator can be used that has no knowledge of the data output or characteristics of the incidental electromagnetic radiation. The random noise generator can be a wide bandwidth noise generator or the random noise generator can be tuned to specific electromagnetic spectrums.

Another exemplary embodiment may include a masking signal generator that is not coupled to and is independent from the near field generator, but the masking signal generator has the capability to detect and respond to the presence of and/or modulation type of near field communications. For example, the masking signal generator may turn on the masking signal when near field communications are detected and turn off the masking signal when the near field communications are not active. In addition, the masking signal generator may select an optimized masking pattern and bandwidth based on the near field communication type that is detected.

In one exemplary embodiment, the masking signal can be uncorrelated to the information encoded in the near field signal when viewed in various dimensions of signal space. In other words, as is known in the art, signals can be viewed in time domain, frequency domain, code domain (for spread spectrum encoded signal), or viewed in vector spaces using defined sets of basis functions. Accordingly, it is helpful for the masking electromagnetic signal and the incidental electromagnetic radiation to be substantially similar regardless of what signal space the signals are viewed in. One way to accomplish this is to generate the masking signal using the same basic processes as the near field signal (e.g. modulation scheme, data format, data timing, etc) while randomizing the masking signal in at least one dimensions relative to the near field signal to provide low or zero cross-correlation between the signals when measured in the at least one dimension. For example, randomizing data used to drive modulation of the signal can accomplish this randomization.

Figure 2:
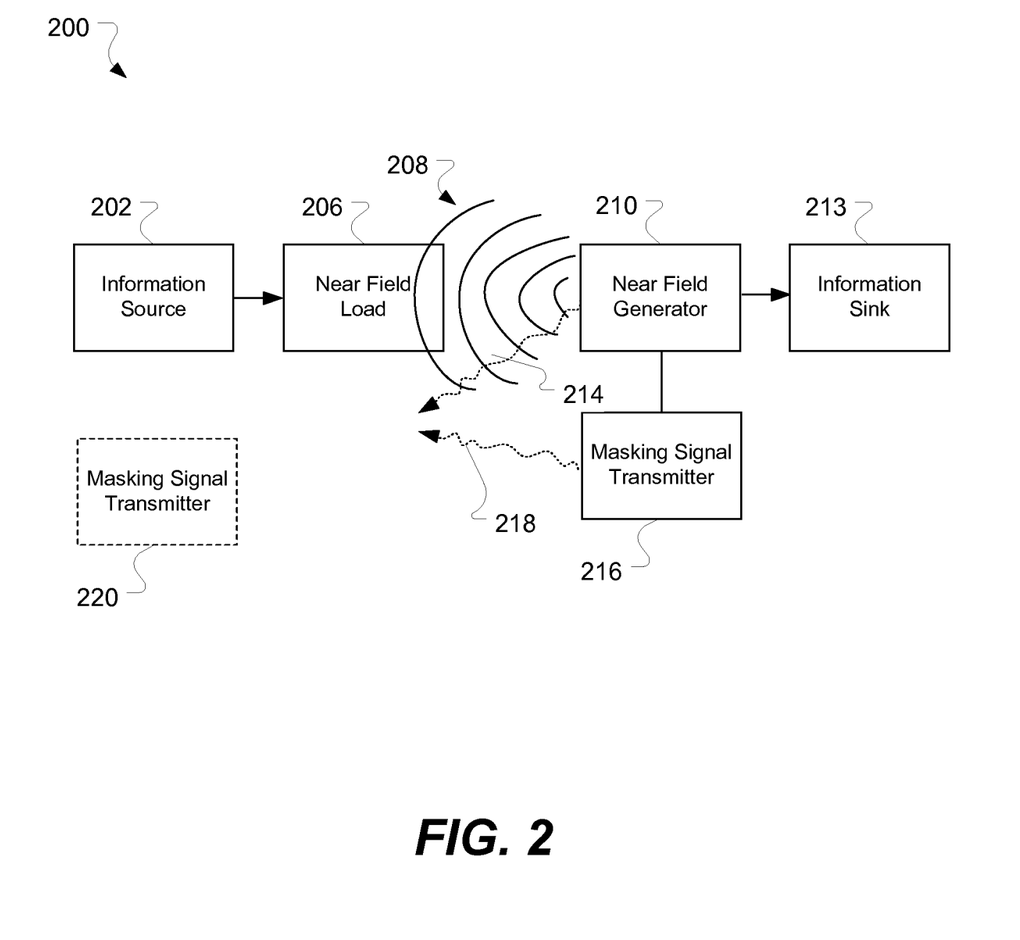
FIG. 2 is a block diagram illustration of a near field communications system having enhanced security by varying a load on a generated field in accordance with an exemplary embodiment of the present invention.

FIG. 2 illustrates another exemplary embodiment of a near field communication system 200. In this configuration, the near field system may exchange information using a near field detector 210 which acts as a near field generator to generate a magnetic or electric field 208. An information source 202 can then vary a load 206 on the generated field which correlates to the information to be exchanged. The near field generator can include modules to detect modulation changes and decode the information encoded in the magnetic or electric field in order to provide an information output to an information sink 213.

The time variation of the near field due to variation of the load on the near field may produce unwanted and spurious incidental electromagnetic radiation 214. This incidental electromagnetic radiation may enable an eavesdropper to more easily detect communication patterns, and so it is valuable to obfuscate the incidental electromagnetic radiation. In a similar manner as discussed previously, a masking signal generator 216 can be provided to generate a masking signal 218. The masking signal generator 216 can be linked to near field generator to provide correlated masking. Alternatively, the masking signal generator 220 can generate the masking signal in an independent fashion as discussed previously.

The present system for using the masking signal transmitter has been described as masking one other device, but the masking signal transmitter can be used to mask two or more devices that are within near field communication range of one another. For example, a masking transmitter may mask: a wireless speaker microphone and a headset to which it is coupled, a wireless remote PTT (Push-to-Talk) switch, a wireless remote control module for volume or channel selection, a wireless data interface to a laptop or other data device, and the masking transmitter itself.

Figure 3:
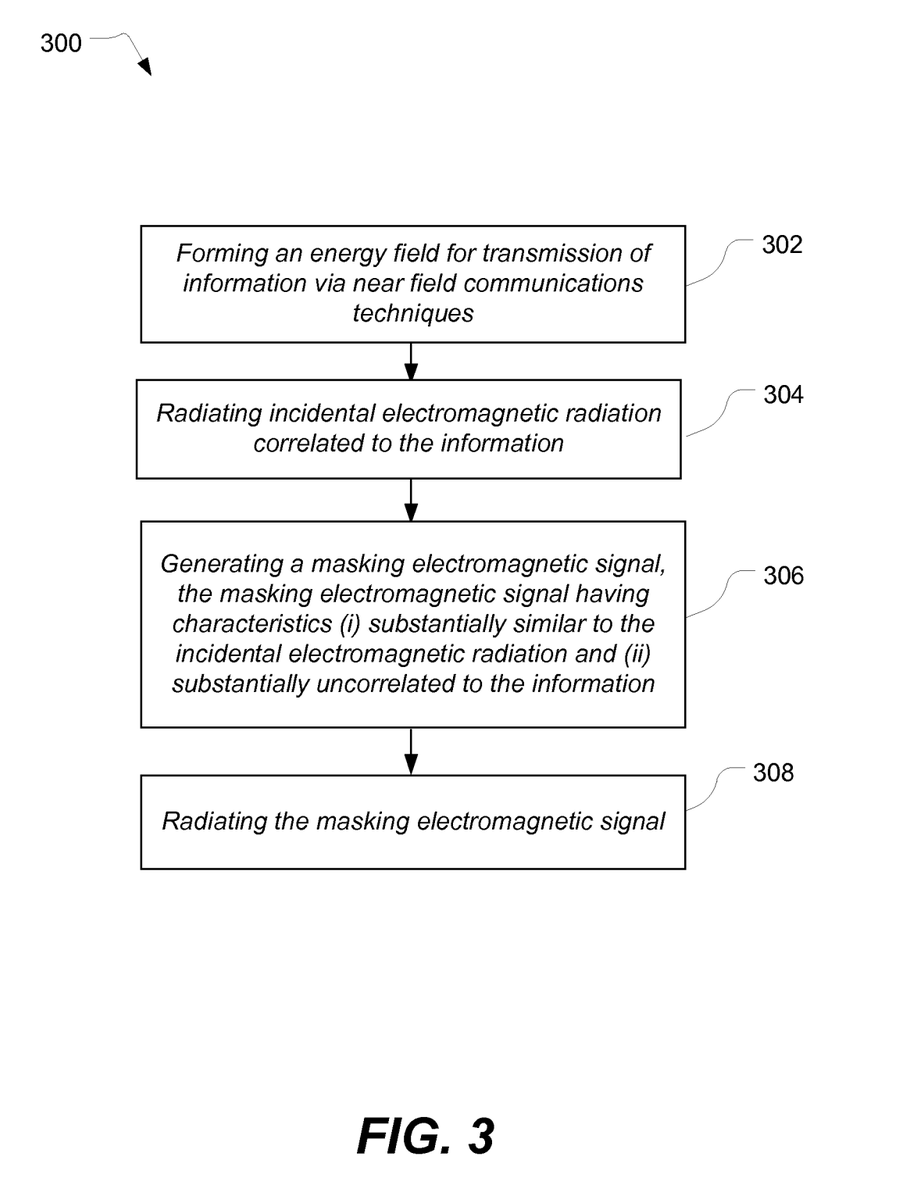
FIG. 3 is a flow chart illustration of a method of enhancing security of a near field communication system in accordance with an exemplary embodiment of the present invention.

Finally, a method for enhancing security of near field communications system is described in conjunction with a flow chart shown in FIG. 3. The method, shown generally at 300, can include forming 302 an energy field for transmission of information via near field communications techniques. For example, the energy field may be a magnetic field or an electric field. Characteristics of the energy field may be varied to encode information thereon. For example, the energy field may be varied in field strength, orientation, etc. The energy field may be varied according to a carrier signal, with characteristics of the carrier signal (e.g. frequency, phase, amplitude, and combinations thereof) varied to encode the information. For example, a carrier signal can have a frequency of 100 kHz, 13.56 MHz, or other frequencies. In general, higher carrier signal frequency provides generally a shorter near field range.

The method includes radiating 304 incidental electromagnetic radiation correlated to the information. For example, as described above, incidental electromagnetic radiation can be produced by a varying magnetic or electric field. The level of incidental electromagnetic radiation may be quite small, having been reduced by filtering, shielding, or other techniques, yet a measurable amount may remain.

The method can also include generating 306 a masking electromagnetic signal. As described above, the masking electromagnetic signal has characteristics substantially similar to the incidental electromagnetic radiation and substantially uncorrelated to the information. The method can include radiating 308 the masking electromagnetic signal. Accordingly, the masking signal can interfere with the incidental electromagnetic radiation, making it difficult for an eavesdropper to decode the information. The masking signal may be similar in signal level to the incidental electromagnetic radiation, helping to hide the information without unacceptable increases in the ability for an adversary to detect the combined radiated signals.

The use of a near field communication system in this disclosure has been described as a short range system but this is a relative term that compares near field systems to existing longer range radio frequency (RF) systems. More specifically, the use of the term short range refers to the near field region of the electromagnetic radiation which is generally equal to or less than $$\frac{\lambda}{2\pi}$$

(the wavelength over 2 pi). For example, there are communication applications such as mining and short range systems where the near field communications can be extended to hundreds of meters by reducing the carrier frequency and increasing the wavelength. For example, a carrier frequency of 100 kHz may be used to generate near fields with a range of over 400 meters.

To summarize, exemplary embodiments of the present invention may be useful in short range communications applications where security and/or low probability of detection are desired. By masking propagating electromagnetic emissions from the near field communications equipment, detection and interception of the near field system can be minimized. Such exemplary embodiments may be particularly useful for hands-free headsets in military, law enforcement, security, public service, and other applications. Other applications can include the transfer of data between computing and communication devices over a short distance or the communication of signals such as stopping and starting other devices or providing a single signal to set a defined state.

It is to be understood that the arrangements described herein are only illustrative of the application for the principles of the present invention. Numerous modifications and alternative arrangements can be devised without departing from the spirit and scope of the present invention as defined by the appended claims and their equivalents. While the present invention has been shown in the drawings and fully described above with particularity and detail with reference to certain exemplary embodiments thereof, it will be apparent to those of ordinary skill in the art that numerous modifications can be made without departing from the principles and concepts of the invention as set forth herein.

The invention claimed is:

1. A near field communication system having enhanced security, the system comprising:
   a near field generator configured to generate a near field magnetic signal having information encoded therein, wherein the near field magnetic signal is communicated using near field magnetic induction to provide a fall off of approximately 60 decibels (dB) per decade of distance, and wherein incidental electromagnetic radiation correlated to the information is produced, with a fall off of approximately 20 dB per decade of distance, when the near field magnetic signal is generated; and
   a masking signal transmitter configured to radiate a masking electromagnetic signal, with a fall off of approximately 20 dB per decade of distance, to mask the incidental electromagnetic radiation, wherein a signal strength of the masking electromagnetic signal is selected to provide a link distance for the near field generator, wherein an increase in the signal strength of the masking electromagnetic signal reduces the link distance for the near field generator by interfering with the near field magnetic signal.

2. The system of claim 1, wherein the masking electromagnetic signal reduces at least one of detectability, decodability and extractability of the information from the incidental electromagnetic radiation.

3. The system of claim 1, wherein the radiated masking electromagnetic signal reduces the detectability of the incidental electromagnetic radiation.

4. The system of claim 1, wherein the masking electromagnetic signal comprises at least one characteristic substantially similar to at least one characteristic of the incidental electromagnetic radiation.

5. The system of claim 1, wherein the radiated masking electromagnetic signal is substantially uncorrelated to the information.

6. The system of claim 1, wherein the masking signal transmitter is coupled to the near field generator and the masking electromagnetic signal is generated using the information.

7. The system of claim 1, wherein the masking signal transmitter is decoupled from the near field generator and the masking electromagnetic signal is generated without using the information.

8. The system of claim 1, wherein the masking signal transmitter is independent from the near field generator.

9. The system of claim 1, wherein a timing associated with the near field generator is different than a timing associated with the masking signal transmitter.

10. The system of claim 1, wherein the masking signal transmitter is configured to radiate a plurality of masking electromagnetic signals.

11. The system of claim 1, wherein the masking signal transmitter is configured to radiate at least one masking electromagnetic signal configured to mask the incidental electromagnetic radiation produced by the near field generator and incidental electromagnetic radiation produced by at least one other near field generator.

12. The system of claim 1, wherein the masking electromagnetic signal is radiated in a direction similar to the incidental electromagnetic radiation.

13. The system of claim 1, wherein the masking electromagnetic signal is designed to spectrally match the incidental electromagnetic radiation.

14. The system of claim 1, wherein the masking electromagnetic signal is configured to occupy substantially the same bandwidth as the incidental electromagnetic radiation.

15. The system of claim 1, wherein the masking electromagnetic signal is configured to occupy a wider bandwidth than the incidental electromagnetic radiation.

16. The system of claim 1, wherein the near field magnetic signal is intentionally radiated by way of magnetic induction.

17. The system of claim 1, wherein the masking electromagnetic signal is generated using a random data generator.

18. The system of claim 1, wherein the masking electromagnetic signal comprises a similar modulation as the near field magnetic signal that is modulated with encoded information.

19. The system of claim 1, wherein the masking electromagnetic signal and the incidental electromagnetic radiation have a combined noise level less than a defined noise level at a preset distance from the system.

20. The system of claim 1, wherein the masking electromagnetic signal is radiated using an antenna.

21. The system of claim 20, wherein the antenna is contained in the same housing as the near field generator.

22. The system of claim 1, wherein a timing signal is provided from the near field generator to the masking signal transmitter.

23. The system of claim 1, wherein the masking signal transmitter extracts a timing signal from the near field magnetic signal.

24. The system of claim 1, wherein the masking electromagnetic signal is radiated at a power level that at least partially masks the incidental electromagnetic radiation beyond the link distance.

25. A near field communication system having enhanced security, the system comprising:
means for generating a near field magnetic signal having information encoded therein, wherein the near field magnetic signal is communicated using near field magnetic induction to provide a fall off of approximately 60 decibels (dB) per decade of distance, and wherein incidental electromagnetic radiation correlated to the information is produced, with a fall off of approximately 20 dB per decade of distance, when the near field magnetic signal is generated; and
means for radiating a masking electromagnetic signal, with a fall off of approximately 20 dB per decade of distance, for masking the incidental electromagnetic radiation, wherein a signal strength of the masking electromagnetic signal is selected to provide a link distance for the near field communication system, wherein an increase in the signal strength of the masking electromagnetic signal reduces the link distance for the near field communication system by interfering with the near field magnetic signal.

26. The system of claim 25, wherein the radiated masking electromagnetic signal reduces at least one of detectability, decodability and extractability of the information from the incidental electromagnetic radiation.

27. The system of claim 25, wherein the radiated masking electromagnetic signal reduces the detectability of the incidental electromagnetic radiation.

28. The system of claim 25, wherein the masking electromagnetic signal comprises at least one characteristic substantially similar to at least one characteristic of the incidental electromagnetic radiation.

29. The system of claim 25, wherein the radiated masking electromagnetic signal is substantially uncorrelated to the information.

30. The system of claim 25, wherein the masking electromagnetic signal is radiated at a power level that at least partially masks the incidental electromagnetic radiation beyond the link distance.

31. A method for enhancing security of a near field communications system, the method comprising:
forming an energy field for wireless communication of information within an achievable link distance via near field communications techniques;
radiating incidental electromagnetic radiation with a fall off of approximately 20 dB per decade of distance, wherein the incidental electromagnetic radiation is correlated to the information;
generating a masking electromagnetic signal, with a fall off of approximately 20 dB per decade of distance, for masking the incidental electromagnetic radiation, wherein a signal strength of the masking electromagnetic signal is selected to provide the achievable link distance for the near field communications system, wherein an increase in the signal strength of the masking electromagnetic signal reduces the achievable link distance for the near field communications system by interfering with a near field magnetic signal from the near field communications system; and
radiating the masking electromagnetic signal with the selected signal strength for masking the incidental electromagnetic radiation.

32. The method of claim 31, wherein the radiating of the incidental electromagnetic radiation comprises varying a load in the energy field.

33. The method of claim 31, wherein the radiated masking electromagnetic signal reduces at least one of detectability, decodability and extractability of the information from the incidental electromagnetic radiation.

34. The method of claim 31, wherein the radiated masking electromagnetic signal reduces the detectability of the incidental electromagnetic radiation.

35. The method of claim 31, wherein the masking electromagnetic signal comprises at least one characteristic substantially similar to at least one characteristic of the incidental electromagnetic radiation.

36. The method of claim 31, wherein the radiated masking electromagnetic signal is substantially uncorrelated to the information.

37. The method of claim 31, wherein the generating of the masking electromagnetic signal comprises generating a plurality of masking electromagnetic signals, further wherein the radiating of the masking electromagnetic signal comprises radiating the plurality of masking electromagnetic signals.

38. The method of claim 31, wherein the masking electromagnetic signal spectrally matches the incidental electromagnetic radiation.

39. The method of claim 31, wherein the masking electromagnetic signal occupies substantially the same bandwidth as the incidental electromagnetic radiation.

40. The method of claim 31, wherein the masking electromagnetic signal occupies a wider bandwidth than the incidental electromagnetic radiation.

41. The method of claim 31, wherein the masking electromagnetic signal is generated using a random data generator.

42. The method of claim 31, wherein the masking electromagnetic signal and the incidental electromagnetic radiation have a combined noise level less than a defined noise level.

43. The method of claim 31, further comprising encoding information in the near field using a digital modulation technique.

44. The method of claim 31, further comprising directing the masking signal m the same direction as the incidental electromagnetic radiation.

45. The method of claim 31, further comprising shielding an energy field generator that is creating the energy field to reduce the level of incidental electromagnetic radiation.

46. The method of claim 31, further comprising providing a timing signal to the masking signal transmitter.

47. The method of claim 31, further comprising extracting a timing signal from the energy field for the wireless communication of the information for use with the masking signal transmitter.

48. The method of claim 31, wherein the energy field for the communication of the information is formed via a capacitive coupling.

49. The method of claim 31, wherein the masking electromagnetic signal is radiated at a power level that at least partially masks the incidental electromagnetic radiation beyond the achievable link distance.

50. A near field communication system having enhanced security for a near field generator, the system comprising:
a masking signal transmitter configured to radiate a masking electromagnetic signal with a fall off of approximately 20 dB per decade of distance, wherein the masking electromagnetic signal is radiated to mask incidental electromagnetic radiation with a fall off of approximately 20 dB per decade of distance, the incidental electromagnetic radiation being produced when a near field detectable signal is generated by the near field generator for wireless communication of information encoded therein, wherein a signal strength of the masking electromagnetic signal is selected to provide a link distance for the near field generator, wherein an increase in the signal strength of the masking signal transmitter reduces the link distance for the near field generator by interfering with the near field detectable signal.

51. The system of claim 50, wherein the radiated masking electromagnetic signal reduces at least one of detectability, decodability and extractability of the information from the incidental electromagnetic radiation.

52. The system of claim 50, wherein the radiated masking electromagnetic signal reduces the detectability of the incidental electromagnetic radiation.

53. The system of claim 50, wherein the masking electromagnetic signal comprises at least one characteristic substantially similar to at least one characteristic of the incidental electromagnetic radiation.

54. The system of claim 50, wherein the radiated masking electromagnetic signal is substantially uncorrelated to the information.

55. The method of claim 50, wherein the masking electromagnetic signal is radiated at a power level that at least partially masks the incidental electromagnetic radiation beyond the link distance.

* * * * *